United States Patent [19]

Koelle et al.

[11] Patent Number: 5,081,088

[45] Date of Patent: Jan. 14, 1992

[54] ZIEGLER-NATTA-TYPE CATALYST SYSTEMS

[75] Inventors: Peter Koelle, Ludwigshafen; Juergen Kerth, Carlsberg, both of Fed. Rep. of Germany

[73] Assignee: BASF Aktiengesellschaft, Ludwigshafen, Fed. Rep. of Germany

[21] Appl. No.: 585,185

[22] Filed: Sep. 20, 1990

[30] Foreign Application Priority Data

Sep. 29, 1989 [DE] Fed. Rep. of Germany ....... 3932553

[51] Int. Cl.⁵ .............................................. C08F 4/654
[52] U.S. Cl. ..................... 502/107; 502/111; 502/120; 502/121; 502/126; 502/127; 526/125
[58] Field of Search ............... 502/107, 111, 120, 121, 502/126, 127

[56] References Cited

FOREIGN PATENT DOCUMENTS 086473 8/1983 European Pat. Off. .
171200 2/1986 European Pat. Off. .
2111066 6/1983 United Kingdom .

Primary Examiner—Patrick P. Garvin
Attorney, Agent, or Firm—Keil & Weinkauf

[57] ABSTRACT

Ziegler-Natta-type catalyst systems contain as active constituents a) a titanium-containing solid component which contains titanium, magnesium, halogen and a norbornadienedicarboxylate of the formula I

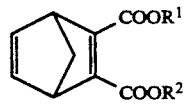

as electron donor, where $R^1$ and $R^2$ are each $C_1$–$C_8$-alkyl or 5- to 7-membered cycloalkyl which in turn can carry $C_1$–$C_{10}$-alkyl groups, b) an aluminum component and c) another electron donor component, and are particularly suitable for preparing polypropylene and copolymers of propylene with minor amounts of other α-olefins with 2 to 8 carbon atoms.

7 Claims, No Drawings

ZIEGLER-NATTA-TYPE CATALYST SYSTEMS

The present invention relates to novel Ziegler-Natta-type catalyst systems containing as active constituents
a) a titanium-containing solid component which contains titanium, magnesium, halogen and a norbornadienedicarboxylate of the formula I as electron donor, where $R^1$ and $R^2$ are each $C_1$-$C_4$-alkyl or 5- to 7-membered cycloalkyl which in turn can carry $C_1$-$C_{10}$alkyl groups,
b) an aluminum component and
c) another electron donor component.

The present invention also relates to the preparation of such catalyst systems, the preparation of propylene polymers using these catalyst systems, the polymers obtainable in this way, and sheets and articles shaped from these polymers.

Ziegler-Natta-type catalyst systems are disclosed, inter alia, in EP-B 14523, EP-A 23425, EP-A 45975 and EP-A 195 497. These systems are used, in particular, for polymerizing α-olefins and contain, inter alia, compounds of polyvalent titanium, halides and/or alkyls of aluminum, and electron donors, especially silicon compounds, ethers, carboxylic esters, ketones and lactones, which are used, on the one hand, in conjuction with the titanium compound and, on the other hand, as independent catalyst component.

In order to ensure economic polyolefin production, catalyst systems of this type must display, inter alia, high productivity. This is defined as the ratio of the amount of polymer formed to the amount of catalyst employed. An additional requirement is that the resulting polymers have maximum stereospecific alignment, i.e. the content of non-isotactic molecular structures should not exceed from 2 to 2.5%.

These two objectives can be achieved together to only a limited extent in prior art processes. Thus, for example, EP-A 86473 discloses a catalyst system in which carboxylic esters and silicon compounds are used as electron donors and which, although it has a satisfactory level of productivity, is unsatisfactory in respect of the stereospecificity of the resulting polymers. EP-A 171 200 describes a Ziegler-Natta-catalyst system which contains, inter alia, carboxylic esters and silicon compounds as electron donors. It is possible with this catalyst system to produce polypropylenes of high stereospecificity but not only is the productivity no longer satisfactory, there is the further disadvantage that the particle size distribution of the resulting polymer is too broad.

Besides these properties which are important, in particular, for the processing of the polymers, also important is a low halogen content in the polyolefin in order to allow such materials to be used in combination with materials which are at risk of corrosion.

Polymerization processes for preparing polyolefins are carried out either in solution, in a suspension or in the gas phase. Gas-phase polymerization differs from the other polymerization processes in being paticularly easy to control. However, this is unavoidably achieved at the expense of a reduction in catalyst productivity and a deterioration in the stereospecificity and the morphological properties of the resulting polymers. Thus, for example, GB-A-2 111 066 describes a catalyst system for the polymerization of polyolefins which likewise contains, inter alia, carboxylic esters and silicon compounds as electron donors. This catalyst system is distinguished by high productivity and good properties of the polymeric products, especially with regard to the stereospecificity, the particle size distribution and the content of extremely fine particles. However, as the relevant comparative test in the present application shows, these properties deteriorate considerably when the polymerization is carried out in the gas phase rather than in solution.

Hence it was an object of the present invention to provide a novel catalyst system which remedies the disadvantages which have been described and with which it is possible, in particular, to prepare, even in the gas phase, with high productivity polyolefins which are distinguished by high stereospecificity and good morphological properties, especially by a minimum content of extremely fine particles.

We have found that this object is achieved by the novel catalyst systems defined in the first paragraph.

The titanium-containing solid component is generally prepared from halides or alcoholates of trivalent or tetravalent titanium, preference being given to the chlorides of titanium, especially titanium tetrachloride. The titanium-containing solid component is normally applied to an extremely finely divided support, those which have proven suitable being silicas and aluminas, as well as aluminum silicates. A particularly preferred support is $SiO_2 \cdot aAl_2O_3$ where a is from 0 to 2, especially from 0 to 0.5.

Further constituents of the titanium-containing solid component are, inter alia, magnesium compounds, suitable ones being halides, alkyls and alkoxy compounds and those particularly used being magnesium dichloride, magnesium dibromide and magnesium $C_1$-$C_{10}$-alkyl compounds. This component also contains a halogen, preferably chlorine or bromine.

The titanium component also contains according to the invention a norbornadienedicarboxylate of the formula I where $R^1$ and $R^2$ are each preferably $C_1$-$C_4$-alkyl. Particularly preferred compounds are the dimethyl, diethyl, dipropyl, diisopropyl and dibutyl esters.

The titanium-containing solid component is preferably prepared by the following two-stage process.

In the first stage, a finely divided support, preferably $SiO_2 \cdot aAl_2O_3$ where a is from 0 to 2, especially from 0 to 0.5, which generally has a particle diameter of from 0.1 to 1000 μm, in particular from 10 to 300 μm, a pore volume of from 0.1 to 10 cm$^3$/g, in particular from 1.0 to 4.0 cm$^3$/g, and a specific surface area of from 10 to 1000, in particular from 100 to 500, m$^2$ is stirred with a solution of the magnesium compound in a liquid alkane at from 10° to 120° C. for from 0.5 to 2 hours. Preferably from 0.1 to 1 mole of the magnesium compound is employed per mole of the support. After this, while continuing the stirring, a halogen or a hydrogen halide, especially chlorine or hydrogen chloride, is introduced in a molar excess based on the magnesium compound which is not less than two-fold, preferably not less than five-fold. After about 30 to 120 minutes, a $C_1$-$C_8$-alkanol, especially ethanol, a halide or an alcoholate of trivalent or tetravalent titanium, especially titanium tetrachloride, and the norbornadienedicarboxylate of the formula I to be employed according to the invention are added to this solution at from 10° to 150° C. From 1 to 5 moles, preferably 2 to 4 moles, of alkanol, from 2 to 20 gram atoms of trivalent or tetravalent titanium and from 0.01 to 1 mole, preferably 0.1 to 1 mole, of the norbornadienedicarboxylate are employed per gram atom of magnesium in the magnesium compound. The solution is stirred at from 10° to 150° C. for at least one hour, and the resulting solid is filtered off.

In the second stage, the solid obtained in the first stage is extracted for some hours at from 100 to 150° C. with excess titanium tetrachloride, which may be in solution in an inert solvent, preferably an alkylbenzene, the solvent containing not less than 5% by weight titanium tetrachloride. The product is then washed with a liquid alkane until the titanium tetrachloride content in the washing liquid is below 2% by weight.

The titanium component obtained in this way is then combined with the aluminum component and another electron donor component.

Suitable aluminum components are not only trialkylaluminum but also such compounds in which one alkyl has been replaced by an alkoxy or by a halogen, for example a chlorine or a bromine. Preferred trialkylaluminum compounds are those in which the substituents each contain from 1 to 8 carbon atoms, for example trimethyl and triethylaluminum.

Besides the titanium-containing solid component and the aluminum component, the catalyst systems according to the invention contain other electron donors such as mono- or polyfunctional carboxylic acids and anhydrides and esters thereof, or ketones, ethers, alcohols, lactones and organophosphorus and organosilicon compounds. Preferred electron donors are organosilicon compounds of the formula II

  II where $R^3$ is one of the radicals $R^1$ or is $C_6$–$C_{10}$-aryl or aralkyl, $R^4$ is $C_1$–$C_{10}$-alkyl, and n is from 0 to 3. Particularly preferred compounds are those where $R^3$ is $C_1$–$C_8$-alkyl or 5- to 7-membered cycloalkyl, $R^4$ is $C_1$–$C_4$-alkyl, and n is 1 or 2.

Compounds which should be particularly mentioned are triethoxytolylsilane, dimethoxyditolylsilane, dimethoxydicyclopentylsilane, dimethoxydiisopropylsilane and dimethoxyisobutylisopropylsilane.

The catalyst systems which are preferably used are those in which the atomic ratio between aluminum in the aluminum component and titanium in the titanium-containing solid component is from 10:1 to 800:1, in particular 20:1 to 200:1, and the molar ratio between the aluminum component and the electron donor component (c) is from 1:1 to 100:1, in particular 2:1 to 80:1.

The catalyst system according to the invention can be used for preparing propylene polymers.

This can be carried out in the conventional reactors used for propylene polymerization, either batchwise or, preferably, continuously, inter alia as suspension polymerization or, preferably, as gas-phase polymerization. Suitable reactors are, inter alia, continuously operated reactors which contain a fixed bed of finely divided polymer which is normally kept in motion by suitable agitators. It is, of course, also possible to carry out the reaction in a plurality of reactors arranged in series. The reaction time depends crucially on the chosen polymerization conditions. It is normally from 0.2 to 20 hours, usually from 0.5 to 10 hours.

By propylene polymers are meant not only homopolymers but also copolymers of propylene with minor amounts of other α-olefins of 2 to 8 carbon atoms, e.g. α-monoolefins or bifunctional α-olefins, for example 1,5-hexadiene. Particularly suitable comonomers are, inter alia, ethylene, 1-butene, 1-pentene, 1-hexene, 1-heptene and 1-octene.

The resulting copolymers can have either a block structure or a random or alternate structure. The catalyst system according to the invention is also particularly suitable for preparing propylene/ethylene copolymers with up to 10% by weight ethylene as copolymerized unit and terpolymers of propylene with minor amounts of ethylene and 1-butene as copolymerized units.

The polymerization is expediently carried out at from 20° to 150° C., preferably 30° to 120° C., under from 1 to 100 bar, preferably 10 to 50 bar. The molecular mass of the polyolefins formed in this way can be controlled and adjusted to a narrow distribution by adding regulators conventional in polymerization technology, for example hydrogen. It is also possible to use inert solvents such as toluene or hexane, inert gases such as nitrogen or argon, and small amounts of polypropylene powder.

The propylene homopolymers and copolymers obtainable according to the invention can be obtained in molecular masses conventional for polyolefins, preferred molecular masses being from 20,000 to 800,000.

The productivity of the catalyst system according to the invention is higher, and its stereospecificity is better, than with catalyst systems hitherto disclosed, especially for gas-phase polymerizations. The polymers obtainable in this way are particularly distinguished by a very low content of particles <0.25 mm and a low chlorine content.

Because of their good mechanical properties, the propylene polymers prepared with the catalyst system according to the invention are especially suitable for producing sheets and shaped articles.

EXAMPLES

Example 1 a) Preparation of the titanium-containing solid component (a)

In a first stage, $SiO_2$ which had a particle diameter of from 20 to 45 μm, a pore volume of 1.75 cm$^3$/g and a specific surface area of 320 m$^2$/g was suspended in n-heptane and mixed with a solution of n-butyloctylmagnesium in n-heptane, using 0.3 mole of the magnesium compound per mole of $SiO_2$. The solution was stirred at 90° C. for 60 minutes and then cooled to 20° C., after which 10 times the molar quantity, based on magnesium compound, of hydrogen chloride was passed in. After 30 minutes, 3 moles of ethanol per mole of magnesium were added to the continuously stirred solution. This solution was stirred at 80° C. for 0.5 hours and then 7 moles of titanium tetrachloride and 0.3 mole of dimethyl norbornadiene-2,3-dicarboxylate, in each case per mole of magnesium, were added. The solution was stirred at 125° C. for 1.5 hours and then the solid was separated from the solvent.

The resulting product was extracted with a 15% by weight solution of titanium tetrachloride in ethylbenzene at 125° C. for 3 hours. The solid was then separated from the extractant by filtration and washed with n-heptane until the latter contained only 0.3% by weight titanium tetrachloride.

b) Polymerization 50 g of polypropylene powder, 10 mmol of triethylaluminum (in the form of a 1 molar solution in n-heptane), 1 mmol of dimethoxyisobutylisopropylsilane (in the form of a 1 molar solution in n-heptane), 10 l of hydrogen and 100 mg of the titanium-containing solid component prepared as in a) were introduced at 30° C. into a 10 l steel autoclave equipped with a stirrer. The reactor was then heated to 70° C. in 10 minutes, and the pressure was adjusted to 28 bar by injecting gaseous propylene, after which polymerization was continued for 2 hours, during which the consumed monomer was continuously replaced.

This resulted in 996 g of a propylene homopolymer with a mean molecular mass of 300,000. The productivity of the catalyst system, which is defined as the ratio of the amount of polymer formed to the amount of titanium-containing solid component, the proportion soluble in heptane, which is a measure of the proportion of non-isotactic structural units, the particle size distribution and the chlorine content of the polymer are compiled in the table which follows.

Example 2

A titanium-containing solid component was prepared as in Example 1a but containing diethyl not dimethyl norbornadiene-2,3-dicarboxylate, in the same molar quantity.

This catalyst was used to polymerize propylene as in Example 1b. The product was 1085 g of a propylene homopolymer with a mean molecular mass of 300,000. The results are to be found in the table which follows.

Comparative Example A

The experiment of Example 1 was repeated using dibutyl maleate as electron donor in the same molar quantity. The results are to be found in the table which follows.

Comparative Example B

Propylene was polymerized under the conditions of Example 1 of the present invention but using the catalyst described in Example 1 of GB-A 2 111 066.

The titanium-containing solid component in this catalyst contained titanium tetrachloride, magnesium chloride and, as electron donor, diisobutyl phthalate. Used there in addition to the titanium-containing solid component were triethylaluminum as aluminum component and phenyltriethoxysilane as further electron donor.

The table which follows compares the results of this experiment (No. B) using the catalyst component of Example 1 of GB-A 2 111 066 with those of the present invention (Nos. 1 and 2) and of the other comparative experiment (No. A).

As is evident from the table, under the conditions of the gas phase polymerization, the productivities and stereospecificities are higher and, in particular, the chlorine contents and contents of particles <0.25 mm are lower with the catalyst systems according to the present invention than with those used in Comparative Experiments A and B.

TABLE

|  | Ex. 1 | Ex. 2 | Comp. Ex. A | Comp. Ex. B |
| --- | --- | --- | --- | --- |
| Productivity (g polypropylene/g titanium-containing solid component) | 9960 | 10,850 | 6,050 | 9,345 |
| Proportion soluble in heptane (% by wt.) | 1.6 | 2.0 | 3.5 | 2.4 |
| Particle size distribution (mm) | | | | |
| <0.25 | 1.5 | 4.0 | 4.9 | 82.4 |
| 0.25–0.5 | 12.9 | 15.8 | 19.6 | 6.6 |
| 0.5–1 | 82.6 | 75.2 | 67.7 | 3.4 |
| 1–2 | 2.8 | 4.5 | 7.3 | 6.0 |
| >2 | 0.2 | 0.5 | 0.5 | 1.6 |
| Chlorine content in the product (ppm) | 23 | 21 | 43 | 60 |

We claim:

1. In a Ziegler-Natta-type catalyst system containing as active constituents
   a) a titanium-containing solid component prepared from a titanium compound, a magnesium compound, a halogen and an electron donor compound,
   b) a trialkylaluminum component, in which one alkyl can be replaced by an alkoxy or by a halogen, and
   c) another electron donor component, the improvement which comprises: using in the titanium-containing solid component as an electron donor a norbornadienedicarboxylate of the formula I

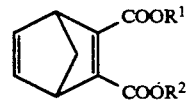

where $R^1$ and $R^2$ are each $C_1$–$C_8$-alkyl or 5- to 7-membered cycloalkyl which in turn can carry $C_1$–$C_{10}$-alkyl groups.

2. A catalyst system of claim 1, where $R^1$ and $R^2$ in the norbornadienedicarboxylate are each $C_1$–$C_4$-alkyl.

3. The catalyst system of claim 1, wherein the trialkylaluminum substituents each have from 1 to 8 carbon atoms.

4. The catalyst system of claim 1, whose other electron donor component (c) is a silicon compound of the formula II $$R^3{}_n Si(OR^4)_{4-n} \qquad \text{II}$$

where $R^3$ is one of the radicals $R^1$ or $C_6$–$C_{10}$-aryl or aryalkyl, $R^4$ is $C_1$–$C_{10}$-alkyl, and n is from 0 to 3.

5. The catalyst system of claim 1, whose other electron donor component (c) is a silicon compound of the formula II where $R^4$ is $C_1$–$C_4$-alkyl.

6. The catalyst system of claim 1, applied to $SiO_2 \cdot aAl_2O_3$ as support, where a is from 0 to 2.

7. A process for preparing a catalyst system as defined in claim 1, which comprises
   a) in a first stage mixing a finely divided support with a solution of a magnesium compound in a liquid alkane at from 10° to 120° C., then passing in a halogen or hydrogen halide in a not less than twofold molar excess and, after about 30 to 120 minutes, mixing this solution at from 10 to 150° C. with a $C_1$–$C_8$-alkanol, a halide or an alcoholate of trivalent or tetravalent titanium and the norbornadienedicarboxylate of the formula I, using from 1 to 5 moles of alkanol, from 2 to 20 gram atoms of trivalent or tetravalent titanium and from 0.01 to 1 mole of the norbornadienedicarboxylate per gram atom of magnesium in the magnesium compound, and subsequently filtering off the resulting solid, b) then in a second stage extracting the solid obtained in the first stage with excess titanium tetrachloride, which may be in solution in an inert solvent, at from 100° to 150° C. for some hours, and subsequently washing with a liquid alkane until the titanium tetrachloride content in the washing liquid is below 2% by weight, and subsequently combining the titanium component obtained in this way with the aluminum component and the other electron donor component.

* * * * *